United States Patent
Jeong et al.

(10) Patent No.: US 9,980,291 B2
(45) Date of Patent: May 22, 2018

(54) METHOD AND APPARATUS FOR RANDOM ACCESS IN WIRELESS COMMUNICATION SYSTEM

(71) Applicant: Samsung Electronics Co., Ltd., Gyeonggi-do (KR)

(72) Inventors: Cheol Jeong, Gyeonggi-do (KR); Jeongho Park, Seoul (KR); Hyunkyu Yu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 244 days.

(21) Appl. No.: 14/692,100

(22) Filed: Apr. 21, 2015

(65) Prior Publication Data
US 2015/0305066 A1    Oct. 22, 2015

(30) Foreign Application Priority Data
Apr. 21, 2014    (KR) .................. 10-2014-0047370

(51) Int. Cl.
| | | |
|---|---|---|
| *H04W 74/08* | (2009.01) | |
| *H04L 12/24* | (2006.01) | |
| *H04W 40/14* | (2009.01) | |
| *H04W 52/24* | (2009.01) | |
| *H04W 52/50* | (2009.01) | |

(52) U.S. Cl.
CPC ..... *H04W 74/0833* (2013.01); *H04L 41/0668* (2013.01); *H04W 40/14* (2013.01); *H04W 52/242* (2013.01); *H04W 52/50* (2013.01)

(58) Field of Classification Search
CPC .............. H04W 74/0833; H04W 40/14; H04L 41/0668
See application file for complete search history.

(56) References Cited

U.S. PATENT DOCUMENTS

| | | | | | |
|---|---|---|---|---|---|
| 7,602,760 | B2* | 10/2009 | Zeira | ................... | H04B 7/0408 370/342 |
| 8,223,791 | B2* | 7/2012 | Meyer | ............... | H04W 74/0833 370/462 |
| 8,295,850 | B2* | 10/2012 | Vujcic | ................... | H04W 74/08 370/330 |
| 8,315,153 | B2* | 11/2012 | Jia | ........................... | H04J 11/00 370/210 |

(Continued)

FOREIGN PATENT DOCUMENTS

KR    10-2015-0000304    1/2012

OTHER PUBLICATIONS

LG Electronics, "Multi-TTI RACH Allocation Methods", R1-070228, 3GPP TSG RAN WG1 Meeting #47bis, Jan. 15-19, 2007, 4 pages.

(Continued)

*Primary Examiner* — Rasheed Gidado
(74) *Attorney, Agent, or Firm* — The Farrell Law Firm, P.C.

(57) ABSTRACT

A method and apparatus are provided for transmitting a random access preamble in a wireless communication system. The method includes estimating path loss based on a downlink signal received from a base station; selecting a random access region based on the estimated path loss; determining a transmission power, based on a false alarm probability of the selected random access region; and transmitting the random access preamble to the base station, based on the determined transmission power.

14 Claims, 10 Drawing Sheets

(56) References Cited

U.S. PATENT DOCUMENTS

| | | | | |
|---|---|---|---|---|
| 8,644,227 | B2* | 2/2014 | Noh | H04W 74/0866 370/329 |
| 9,516,611 | B2* | 12/2016 | Kim | H04W 52/50 |
| 9,544,111 | B2* | 1/2017 | Noh | H04L 5/0048 |
| 2007/0165567 | A1* | 7/2007 | Tan | H04J 13/004 370/329 |
| 2008/0267126 | A1* | 10/2008 | Vujcic | H04B 7/2637 370/330 |
| 2009/0042582 | A1 | 2/2009 | Wang et al. | |
| 2009/0176525 | A1* | 7/2009 | Wang | H04W 52/146 455/522 |
| 2009/0180436 | A1* | 7/2009 | Vujcic | H04L 5/0091 370/330 |
| 2009/0286566 | A1* | 11/2009 | Lindholm | H04W 52/10 455/522 |
| 2010/0220666 | A1* | 9/2010 | Imamura | H04W 74/002 370/329 |
| 2010/0226324 | A1* | 9/2010 | Lee | H04W 48/08 370/329 |
| 2010/0278137 | A1* | 11/2010 | Kwon | H04J 13/0059 370/330 |
| 2011/0039499 | A1* | 2/2011 | Zhang | H04W 74/008 455/67.11 |
| 2013/0102345 | A1 | 4/2013 | Jung | |
| 2014/0376466 | A1* | 12/2014 | Jeong | H04W 74/0833 370/329 |
| 2015/0023281 | A1* | 1/2015 | Wu | H04W 52/146 370/329 |

OTHER PUBLICATIONS

Samsung, "Coverage Enhancements for MTC UEs", R1-133100, 3GPP TSG RAN WG1 #74, Aug. 19-23, 2013, 6 pages.

Qualcomm Incorporated, "RACH Channel Design for MTC Coverage Enhancements", R1-135296, 3GPP TSG-RAN WG1 #75, Nov. 11-15, 2013, 3 pages.

European Search Report dated Sep. 1, 2015 issued in counterpart application No. 15164365.7-1857, 7 pages.

European Search Report dated Nov. 25, 2015 issued in counterpart application No. 15164365.7-1857, 17 pages.

* cited by examiner

METHOD AND APPARATUS FOR RANDOM ACCESS IN WIRELESS COMMUNICATION SYSTEM

PRIORITY

This application claims priority under 35 U.S.C. § 119(a) to Korean Patent Application No. 10-2014-0047370, which was filed in the Korean Intellectual Property Office on Apr. 21, 2014, the entire disclosure of which is incorporated herein by reference.

BACKGROUND OF THE INVENTION

1. Field of the Invention

The present invention relates generally to random access in a wireless communication system, and more particularly, to a method and an apparatus for random access transmission and/or detection in a wireless communication system.

2. Description of the Prior Art

In order for a terminal to connect to a network, communication standards, such as Worldwide Interoperability for Microwave Access (WiMAX) and $3^{rd}$ Generation Partnership Project Long Term Evolution (3GPP LTE), provide a Random Access Channel (RACH) or a ranging channel.

In general, the RACH is designed considering performance of a cell edge user. Accordingly, a length of a random access preamble used for random access should be set sufficiently long enough for a cell edge user to meet a detection probability and a false alarm probability according to a cell coverage area. If the length of the random access preamble is limited, the cell coverage area will also be limited. In this case, when a false alarm probability condition is relaxed, i.e., when a target false alarm probability is increased, a minimum Signal-to-Noise Ratio (SNR) for detecting a preamble by a base station may be decreased, thereby expanding a cell coverage area. However, because the false alarm probability increases, the number of false alarms increases, thereby wasting up/downlink resources.

SUMMARY OF THE INVENTION

Accordingly, the present invention has been made to address at least the problems and/or disadvantages described above and to provide at least the advantages described below.

An aspect of the present invention is to provide a method and apparatus for increasing a cell coverage area, without increasing signaling overhead caused by false alarms, when a length of a preamble is limited.

Another aspect of the present invention is to provide a method and an apparatus for efficient random access in a communication system.

Another aspect of the present invention is to provide a method and an apparatus for transmitting a random access preamble based on a path loss.

Another aspect of the present invention is to provide a method and an apparatus for applying an adaptive threshold value for detecting a preamble.

In accordance with an aspect of the present invention, a method of transmitting a random access preamble by a terminal in a wireless communication system is provided. The method includes estimating path loss based on a downlink signal received from a base station; selecting a random access region based on the estimated path loss; determining a transmission power, based on a false alarm probability of the selected random access region; and transmitting the random access preamble to the base station, based on the determined transmission power.

In accordance with another aspect of the present invention, a terminal is provided for transmitting a random access preamble in a wireless communication system. The terminal includes a transceiver configured to transmit and receive a signal; and a controller configured to estimate path loss based on a downlink signal received from a base station, select a random access region based on the estimated path loss, determine transmission power, based on a false alarm probability of the selected random access region, and transmit, to the base station, via the transceiver, a random access preamble based on the determined transmission power.

In accordance with another aspect of the present invention, a method of detecting a random access preamble by a base station in a wireless communication system is provided. The method includes determining a plurality of random access preamble detection threshold values for a plurality of random access resources, respectively; and detecting a signal received from a terminal using one of the plurality of random access resources, based on a random access preamble detection threshold value among the plurality random access preamble detection threshold value corresponding to the one of the plurality of random access resources.

In accordance with another aspect of the present invention, a base station is provided for detecting a random access preamble in a wireless communication system. The base station includes a transceiver configured to transmit and receive a signal; and a controller configured to determine a plurality of random access preamble detection threshold values for a plurality of random access resources, respectively, and detect a signal received from a terminal using one of the plurality of random access resources, based on a random access preamble detection threshold value among the plurality random access preamble detection threshold value corresponding to the one of the plurality of random access resources.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

To improve communication capacity in a next-generation communication system, broadband in a super high frequency domain may be used to transceive data. However, it is difficult to secure frequency resources for broadband in a frequency domain of 2.5 GHz or 5 GHz, which are currently used in Long Term Evolution (LTE), but it is relatively easier to secure a comparatively broad bandwidth in a millimeter wave (mm Wave) of 30 GHz. However, in general, when a frequency band increases, path loss increases. Accordingly, in a wireless communication system operated in a super-high frequency domain, to compensate for increased path loss, a beamforming gain is increased by using a plurality of antennas in a terminal and a base station. When the number of antennas increases, beam width decreases and beamforming gain increases, and when the number of antennas decreases, beam width increases and beamforming gain is decreases. In this case, because each beam has directionality, the directions of beams used by a terminal and a base station should be similar to each other in order to obtain a large beamforming gain.

When a terminal first attempts to connect to a network through a random access channel, attempts to reconnect after a connection with a network is interrupted, or performs a handover to an adjacent base station, the terminal cannot be aware of a location of a base station. Accordingly, when the terminal performs beamforming using a plurality of antennas in a wireless communication system using a super-high broadband, the terminal should use multi-directional beams. Because the terminal should transmit a random access preamble using multi-directional beams, random access takes a long time. Accordingly, a method of increasing cell coverage while using limited time resources used for a preamble in a beamforming system has been further demanded.

Although embodiments of the present invention will be described below, based on an example of an Orthogonal Frequency Division Multiplexing (OFDM)/Orthogonal Frequency Division Multiple Access (OFDMA) wireless communication system, the present invention is not limited to the OFDM wireless communication system.

Figure 1:
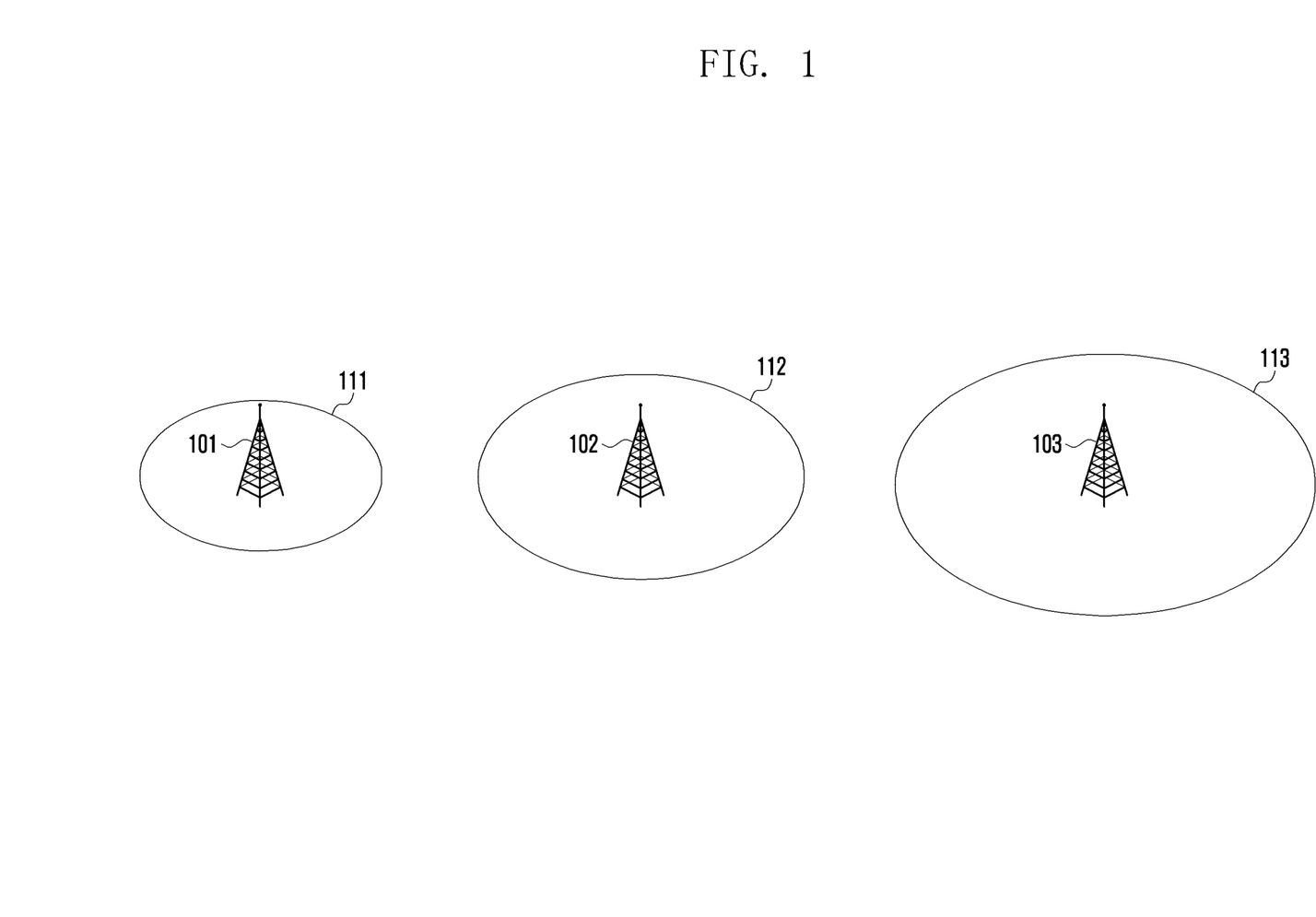
FIG. 1 illustrates examples of random access coverage of base stations.

FIG. 1 illustrates examples of random access coverage of base stations.

Referring to FIG. 1, random access false alarm probabilities of a base station 1 101, a base station 2 102, and a base station 3 103 are set to $P_{FA,1}$, $P_{FA,2}$, and $P_{FA,3}$, respectively. A false alarm probability indicates the likelihood of a base station incorrectly determining that a terminal attempts random access, even though the base station does not receive a random access request from the terminal in a random access detection section.

In FIG. 1, a relation of $P_{FA,1} < P_{FA,2} < P_{FA,3}$ is established, and when a false alarm probability is set to be large, access coverage areas 111, 112, and 113 are further widened. Further, when the set false alarm probability is increased, the number of false alarms increases, thereby increasing uplink/downlink resource waste. Accordingly, when a random access false alarm probability increases, although random access coverage widens (i.e., a required SNR decreases, so that cell coverage may be widened), signaling overhead increases due to the increased number of false alarms.

Figure 2:
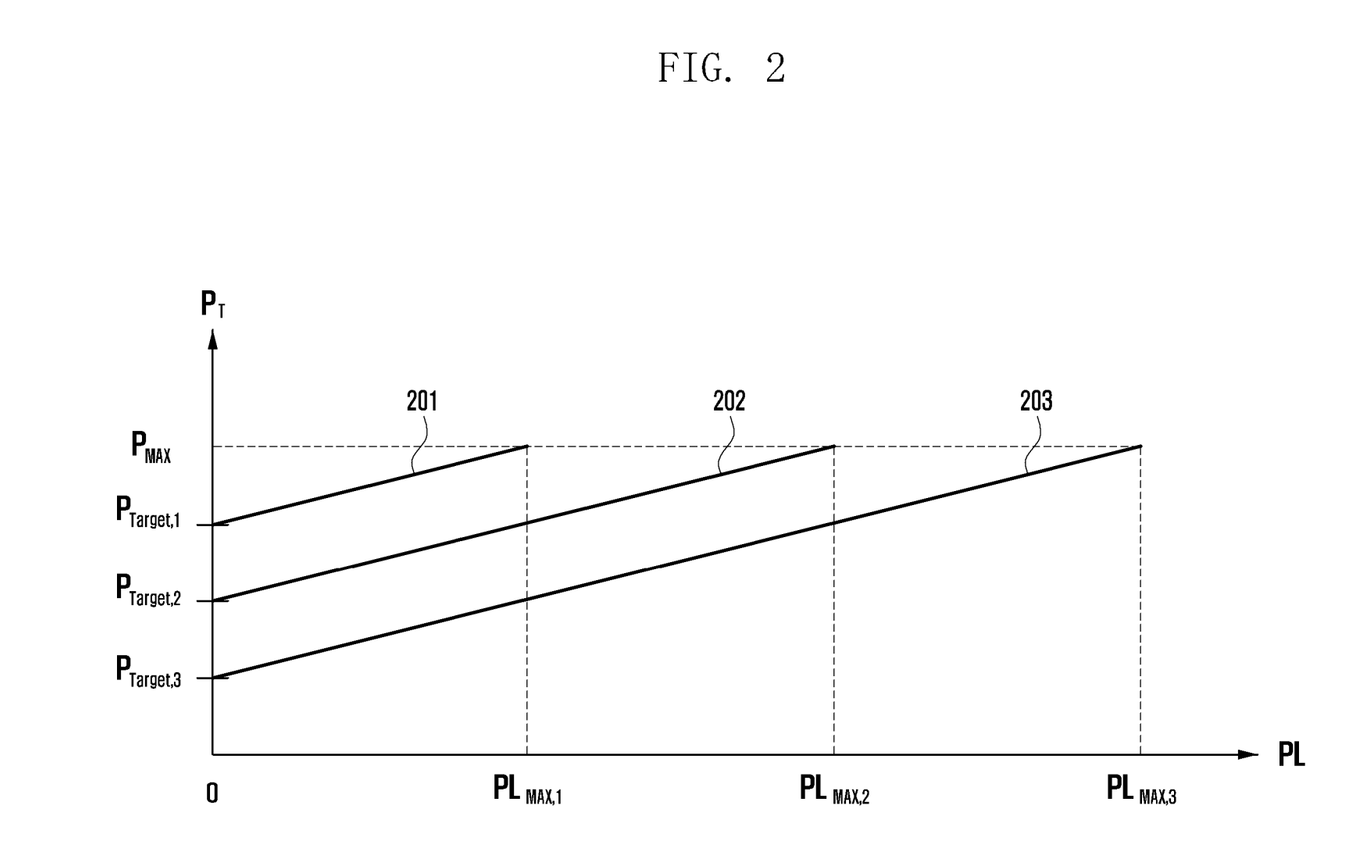
FIG. 2 is a graph illustrating a power value to be used when a terminal transmits a random access preamble according to a false alarm probability set by a base station.

FIG. 2 illustrates a power value to be used when a terminal transmits a random access preamble according to a false alarm probability set by a base station.

Referring to FIG. 2, $P_{Target,1}$, $P_{Target,2}$, and $P_{Target,3}$ are given as random access target power values of a first base station, a second base station, and a third base station, respectively. The base stations may use a number of random access preamble formats, and the random access target power values may vary according to a used random access preamble format. In FIG. 2, for convenience of description, the base stations use the same random access preamble format, a relation of $P_{FA,1} < P_{FA,2} < P_{FA,3}$ is established, and a relation of $P_{Target,1} > P_{Target,2} > P_{Target,3}$ is established.

A power value $P_T$ used when a terminal transmits a random access preamble to a base station i may be represented as shown in Equation (1).

$$P_T = \max(P_{MAX}, P_{Target,i} + PL) \quad (1)$$

In Equation (1), $P_{MAX}$ is a maximum power usable when a terminal transmits a random access preamble, PL is an estimated path loss estimated for setting a power value of a random access preamble by the terminal, and $P_T$ is a power value when the terminal first transmits a random access preamble in a random access procedure.

Referring to FIG. 2, graphs 201, 202, and 203 illustrate random access preamble power values set according to path loss PL, based on Equation (1), by the first base station, the second base station, and the third base station, respectively. A coverage area of each base station may be determined from a path loss maximum value $PL_{MAX,i}$ of each base station. The path loss maximum value of the first base station $PL_{MAX,1}$ is smallest, and the coverage of the first base station is the smallest. Conversely, the path loss maximum value of the third base station $PL_{MAX,3}$ is the largest, and the coverage of the third base station is largest. That is, the random access coverage of the third base station having the largest false alarm probability is the largest.

Figure 3:
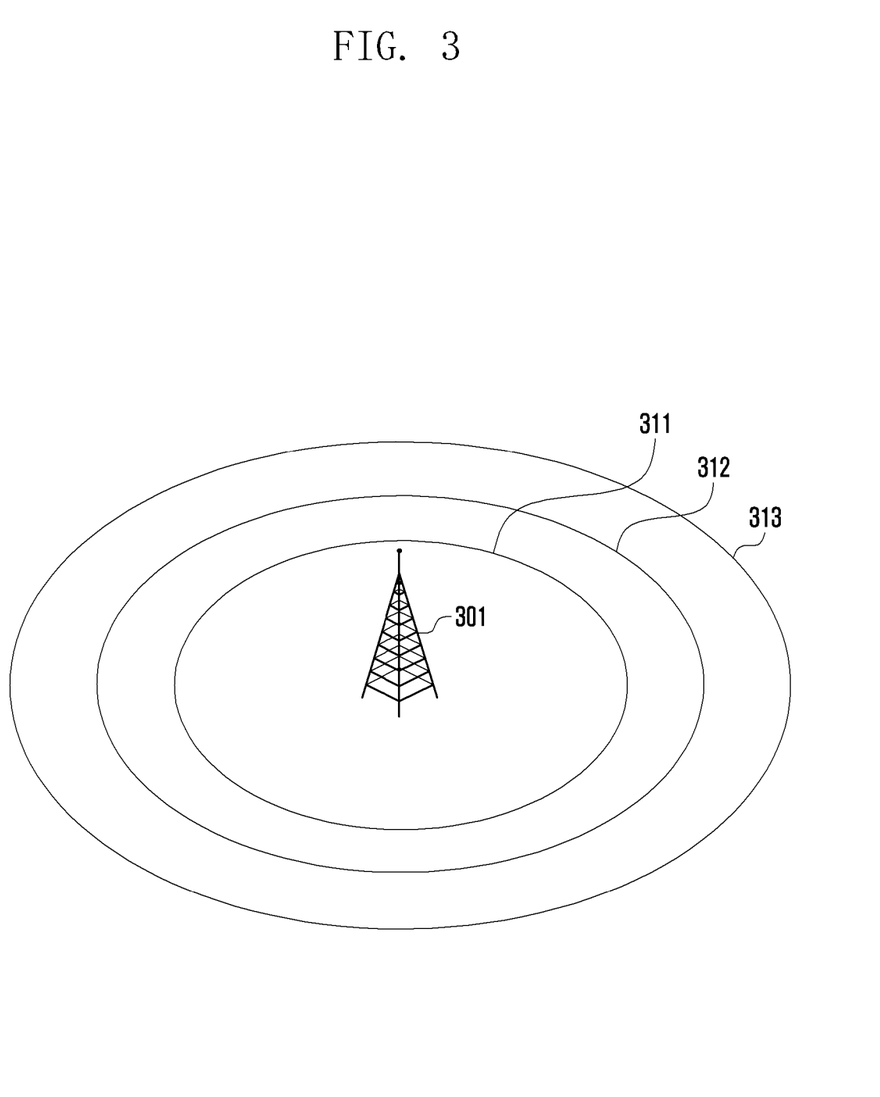
FIG. 3 illustrates random access coverage when a base station operates over three different random access regions and sets different false alarm probability values to the three different random access regions, respectively, according to an embodiment of the present invention.

FIG. 3 illustrates random access coverage when a base station operates over three different random access regions and sets different false alarm probability values to the three different random access regions, respectively, according to an embodiment of the present invention. Specifically, in FIG. 3, each random access region represents a random access method in which a random access preamble transmission and detection method may be differently defined.

Referring to FIG. 3, a base station 301 operates over a random access region 311, a random access region 312, and a random access region 313. False alarm probabilities of the random access regions 311, 312, and 313 are set to $P_{FA,1}$, $P_{FA,2}$, and $P_{FA,3}$, respectively. Further, a relation of $P_{FA,1} < P_{FA,2} < P_{FA,3}$ is established. A terminal located inside the random access region 311 transmits a random access preamble according to a method defined in the random access region 311, a terminal located between the random access region 311 and the random access region 312 transmits a random access preamble according to a method defined in the random access region 312, and a terminal located between the random access region 312 and the random access region 313 transmits a random access preamble according to a method defined in the random access region 313.

In FIG. 3, the random access coverage corresponding to the false alarm probability is not limited to a physical distance.

In accordance with an embodiment of the present invention, random access coverage corresponding to a false alarm probability is based on path loss. When a physical distance from the base station is increased, path loss may be increased, but various mobile communication environments may influence path loss, as well as a physical distance. Accordingly, the random access coverage is determined based on path loss according to various reasons in a mobile communication environment.

Figure 4:
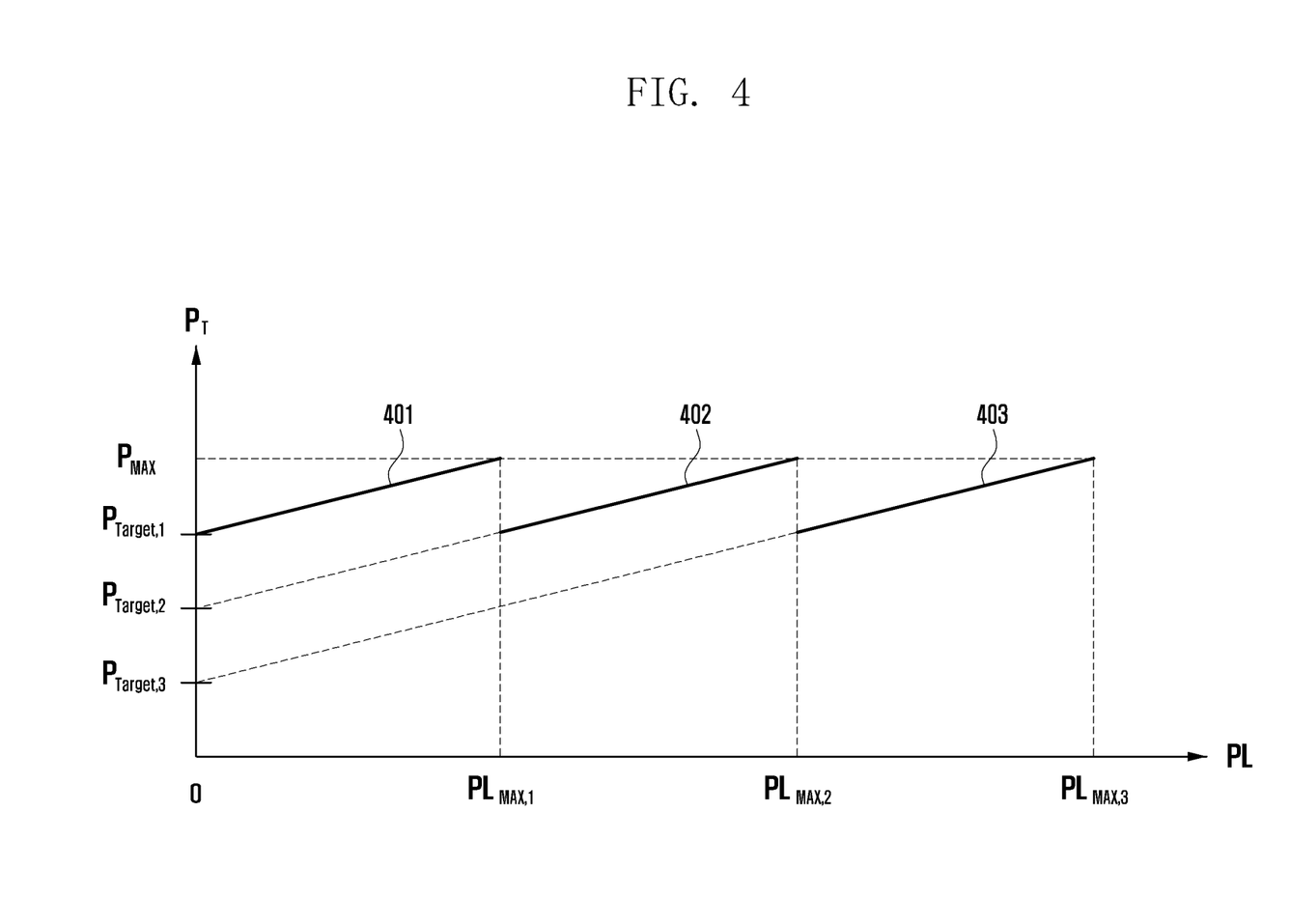
FIG. 4 is a graph illustrating a power value to be used when a base station operates over three different random access regions and a terminal transmits a random access preamble according to false alarm probabilities set to the three different random access regions, respectively, according to an embodiment of the present invention.

FIG. 4 is a graph illustrating a power value to be used when a base station operates over three different random access regions and a terminal transmits a random access preamble according to false alarm probabilities set to the three different random access regions, respectively, according to an embodiment of the present invention.

Referring to FIG. 4, $P_{Target,1}$, $P_{Target,2}$, and $P_{Target,3}$ are random access target power values of corresponding to random access regions 1, 2, and 3 provided by the base station. The number of random access preamble formats operable by the base station may be two or more, and the random access target power value may be varied according to the random access preamble format. Hereinafter, for convenience of description, it is assumed that the base station uses the same random access preamble format, even though a random access region is different. In this case, when a relation of $P_{FA,1} < P_{FA,2} < P_{FA,3}$ is established, a relation of $P_{Target,1} > P_{Target,2} > P_{Target,3}$ is established.

According to an embodiment of the present invention, it is possible to increase coverage through a connection with a random access region of which a false alarm probability is different according to the path loss of the terminal. That is, when path loss of the terminal increases, the terminal is connected to a random access region having a small random access target power value, thereby increasing coverage. For example, when path loss of a terminal is $0 < PL \leq PL_{MAX,1}$, the terminal follows a random access method defined in a random access region 1, when path loss of the terminal is $PL_{MAX,1} < PL \leq PL_{MAX,2}$, the terminal follows a random access method defined in a random access region 2, and when path loss of the terminal is $PL_{MAX,2} < PL \leq PL_{MAX,3}$, the terminal follows a random access method defined in a random access region 3. A power value $P_T$ used when the terminal transmits a random access preamble according to the method defined in the random access region i (i=1, 2, and 3) may be represented by Equation (1), as described above.

In FIG. 4, graphs 401, 402, and 403 illustrate random access preamble power values set according to path loss PL for the random access regions 1, 2, and 3, respectively.

Figure 5:
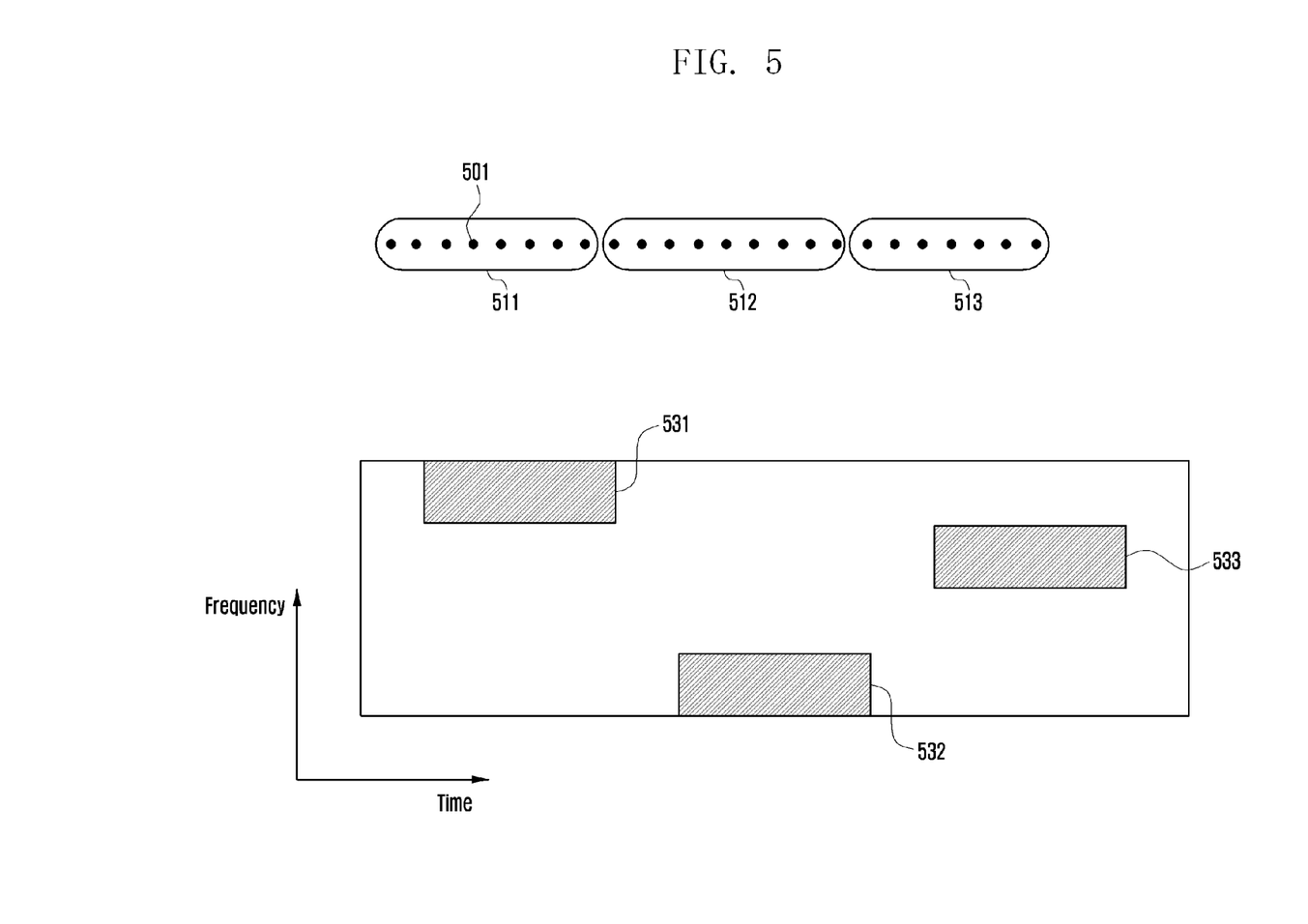
FIG. 5 illustrates an allocation of different random access resources to different random access regions, respectively, according to an embodiment of the present invention.

FIG. 5 illustrates an allocation of different random access resources to different random access regions, respectively, according to an embodiment of the present invention. In FIG. 5, the different random access resources may be allocated to random access regions, respectively, so that the terminal may transmit a preamble with transmission power based on a false alarm probability corresponding to each random access region, and the base station may detect the preamble with a threshold value corresponding to each region.

Referring to FIG. 5, a random access resource includes a sequence, a time, and a frequency. For example, reference numeral 501 is one of the random access preamble sequences, and different combinations 511, 512, and 513 of the sequences may be allocated to each random access region. For another example, different time/frequency resources 531, 532, and 533 may be respectively allocated to the random access regions in a frame.

In accordance with an embodiment of the present invention, when a random access resource is selected and used, it is possible to select and use a resource based on a random access region determined according to path loss. The base station may differently set a threshold value, when detecting a random access preamble according to a resource.

When the base station detects a random access preamble, the amount of overhead caused by false alarms is determined based on a false alarm probability set for each random access region and the amount of resources allocated to each random access region. It is assumed that the total number of random access regions is $K_{MAX}$. It is assumed that the total amount of resources, which the base station may allocate for random access, is 1, and the total amount of resources allocated to a $K^{th}$ random access region is $R_K$. In this case, $R_1 + R_2 + \ldots + R_K = 1$. It is assumed that a false alarm probability set for the $K^{th}$ random access region is $P_{FA,K}$. When the base station detects a random access preamble, the total amount of overhead generated by a false alarm L may be calculated using Equation (2).

$$L = R_K * P_{FA,K} \qquad (2)$$

In Equation (2), the total amount of overhead L is determined based on an amount of resources $R_K$ allocated to the $K^{th}$ random access region and a false alarm probability $P_{FA,K}$ set for the $K^{th}$ random access region. Using Equation (2), it is possible to adjust the total amount of overhead L generated due to a false alarm by adjusting the amount of resources for each random access region $R_K$ and a false alarm probability $P_{FA,K}$.

As described above, when the false alarm probability is adjusted in the random access region, a trade off relation exists between the adjusted false alarm probability and the generated overhead. In accordance with an embodiment of the present invention, because a false alarm probability may be adjusted according to the amount of resources of each random access region, it is possible to increase coverage while maintaining the total overhead of the coverage with a predetermined level.

When the amount of resources for each random access region is determined, the number of terminals using each region should be considered. That is, when the number of terminals in a predetermined region increases, the number of random access attempts in the predetermined region may also increase, and therefore, the amount of resources may need to be increased. Further, when the number of random access attempts according to a change in a mobile communication environment, as well as the number of terminals, is large, the amount of resources may need to be increased.

The base station may include information about a random access region into system information and notify the terminal of the information about the random access region by using a broadcast channel or a data channel. Further, the information about the random access region may be included in a MAC message or control information of a physical control channel to be transmitted. The information about the random access region may include a portion or all of the information below.

Information about the Random Access Region (i) Mapping information about each random access region and a range of a path loss value:

Information on a value of PL_{MAX,1}, PL_{MAX,2}, . . . , PL_{MAX, K_{MAX}}.

(ii) Location information about random access sequence, time, and frequency resources included in each random access region:

Sequence set 1 when K=1, sequence set 2 when K=2, . . . .

Location of time/frequency resource when K=1, Location of time/frequency resource when K=2, . . . .

(iii) Random access preamble target reception power for each random access region:

Information on a value of P_{Target,1}, P_{Target,2}, . . . , P_{Target, K_{MAX}}.

The base station may change the information about the random access region according to a renewal of information on the average number of times of random access attempt for each region.

Figure 6:
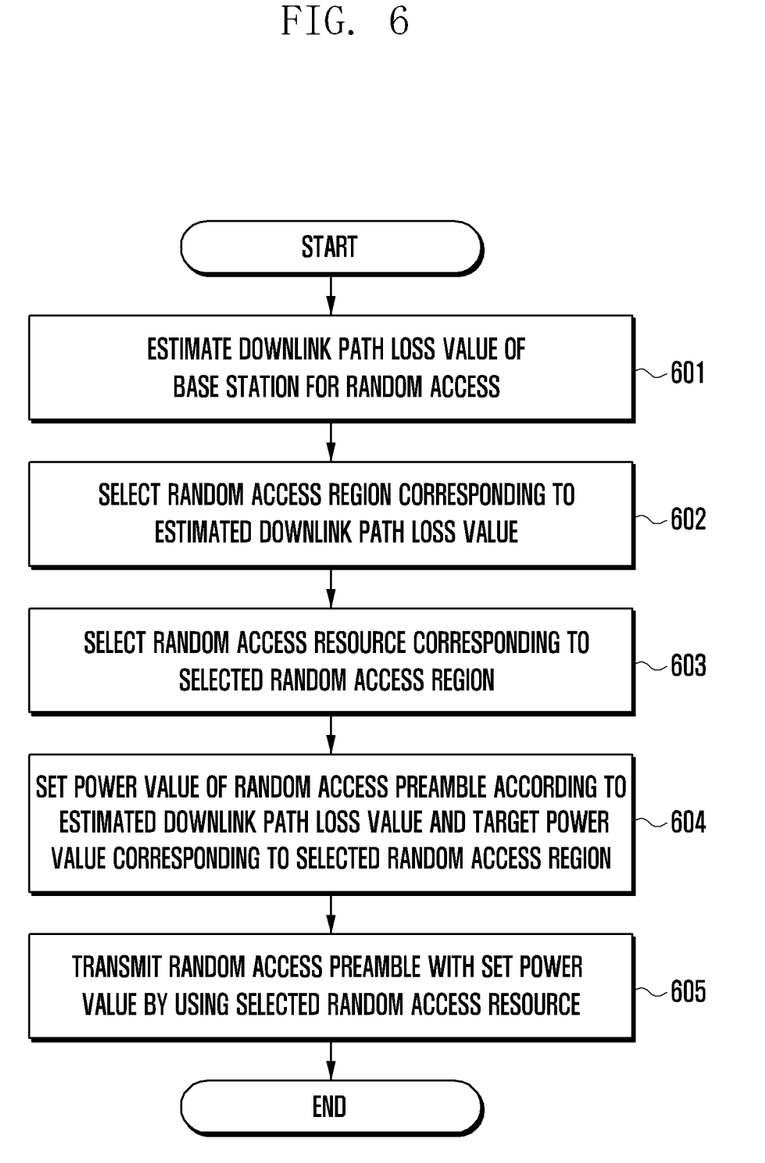
FIG. 6 is a flowchart illustrating an operation procedure of a terminal in a wireless communication terminal according to an embodiment of the present invention.

FIG. 6 is a flowchart illustrating an operation procedure of a terminal in a wireless communication terminal according to an embodiment of the present invention. For example, a terminal may attempt random access to a base station using the method illustrated in FIG. 6 for an initial access to a network, to re-access after a connection is interrupted, to handover to an adjacent cell, to uplink time synchronization re-setting, etc.

Referring to FIG. 6, the terminal receives a downlink reference signal from a base station to which the terminal desires to attempt random access, and estimates a downlink path loss value in step 601. In step 602, the terminal selects a random access region corresponding to the estimated downlink path loss value.

In step 603, the terminal selects one of random access resources corresponding to the selected random access region according to random access resource mapping information received from the base station by a predetermined method. The random access resource mapping information may include resource information corresponding to the random access region.

In accordance with an embodiment of the present invention, it is possible to select a resource used for the random access according to the selected random access region. As described above, the selection of the random access region may be determined based on estimated path loss. When the terminal transmits a random access preamble in each resource region, the base station may attempt to detect the random access preamble based on a preset threshold value. Examples of a method of selecting the random access resource may include randomly selecting one of multiple resources or selecting a resource that is determined by the base station.

In order to select the resource, the terminal may receive the random access resource mapping information in advance. For example, the terminal may receive the random access resource mapping information through a random access channel configuration message transmitted by the base station.

In step 604, the terminal sets a power value of the random access preamble, e.g., according to Equation (1), as described above.

In step 605, the terminal transmits the preamble with the set power value using the random access resource selected in step 603.

Figure 7:
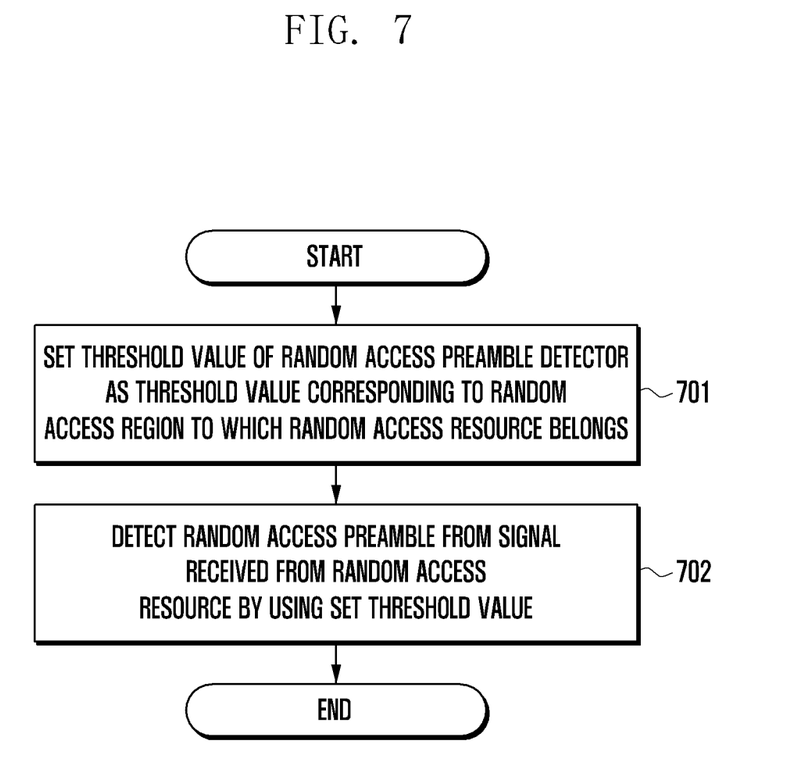
FIG. 7 is a flowchart illustrating an operation procedure of a base station in a wireless communication terminal according to an embodiment of the present invention.

FIG. 7 is a flowchart illustrating an operation procedure of a base station in a wireless communication terminal according to an embodiment of the present invention.

Referring to FIG. 7, in step 701, the base station sets a threshold value of a preamble detector for each random access resource for use as a threshold value corresponding to a random access region to which the random access resource belongs. Herein, the threshold value is determined using a false alarm probability. That is, in order to set a small false alarm probability, the threshold value will be large, and in order to set a large false alarm probability, the threshold value will be small.

In step 702, the base station detects a random access preamble from a signal received from a random access resource, based on the set respective threshold value for the random access region corresponding to the random access resource.

Conventionally, there was no configuration in which a base station applied different threshold values for detecting a preamble. For example, in the related art, different sequence groups are simply selected according to an amount of uplink resources. However, in accordance with an embodiment of the present invention, coverage is increased by applying different threshold values for detecting random access preambles to different random access preamble regions.

Figure 8:
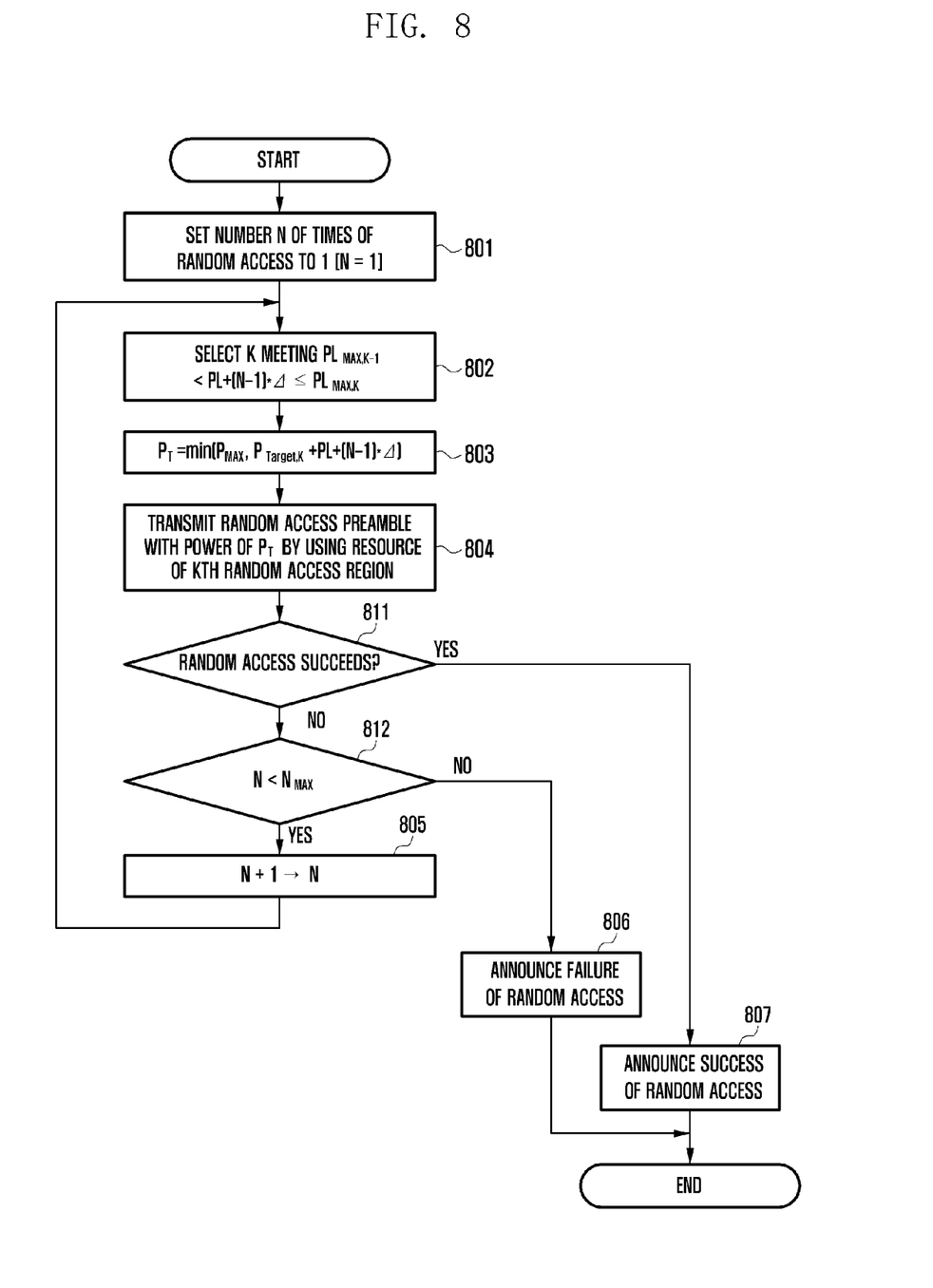
FIG. 8 is a flowchart illustrating a procedure of a terminal for setting power when transmitting a random access preamble according to an embodiment of the present invention.

FIG. 8 is a flowchart illustrating a procedure of a terminal for setting power when transmitting a random access preamble according to an embodiment of the present invention.

Referring to FIG. 8, in step 801, the terminal sets the number of times N that a random access attempt is made to 1. In step 802, a random access region K, which satisfies Equation (3), is searched for $1 \leq K \leq K_{MAX}$, where $K_{MAX}$ is the total number of random access regions.

$$PL_{MAX,K-1} < PL + (N-1)*\Delta \leq PL_{MAX,K} \qquad (3)$$

In Equation (3), it is assumed that $\Delta$ is an increase value of power of the preamble after the terminal fails to attempt random access, and $PL_{MAX,0}$ is 0.

In step 803, the terminal sets the power of a random access preamble according to Equation (4).

$$P_T = \max(P_{MAX}, P_{Target,K} + PL + (N-1)*\Delta) \qquad (4)$$

In step 804, the terminal selects a random access resource mapped to the Kth random access region, and transmits the random access preamble using the selected random access resource.

In step 811, is the terminal determines whether the random access attempt is successful.

For example, for contention-based random access, the random access attempt is determined to be successful when the base station succeeds in detecting the random access preamble transmitted by the terminal, the base station transmits random access response, the terminal transmits an Identify (ID) to the base station, and the base station finally selects a corresponding terminal among the several terminals and transmits information about the selection of the corresponding terminal to the terminal.

For contention free random access, the random access attempt is determined to be successful when the base station succeeds in detecting the random access preamble transmitted by the terminal and the base station transmits a random access response to the terminal.

When it is determined that the random access attempt is successful in step 811, the terminal announces that the random access is successful in step 807. However, when it is determined that the random access attempt has failed in step 811, the terminal determines whether the number of random access attempts is smaller than a maximum value $N_{MAX}$ in step 812.

When the number of times of random access attempts has reached the maximum value in step 812, is the terminal announces that the random access has failed in step 806. However, when the number of times of random access attempts is smaller than the maximum value, the value of N indicating the number of random access attempts is increased by 1 in step 805, and the procedure returns to step 802 to repeat the aforementioned steps.

The above-described embodiments of the present invention may also be appropriately modified and used in a beamforming system. In a beamforming system, a base station and a terminal use one or more beams. The random access resource includes a plurality of time slots, and a preamble for a pair of transception beams of the terminal and the base station is transmitted in one time slot.

Referring to FIG. 6, for the beamforming system, when the downlink pass loss is estimated in step 601, the estimated path loss may include pass loss values for a plurality of pairs of transception beams. In this case, a representative value determined from the plurality of pass loss values is considered when the random access region is selected in step 602, and is used for setting the power value of the preamble in step 604. In the beamforming system, the terminal transmits the random access preamble by using a plurality of transmission beams in step 605. That is, in the beamforming system, the terminal may transmit a preamble for a plurality of pairs of beams.

Referring to FIG. 7, in the beamforming system, the base station may also detect the preamble for each signal received for one pair of transception beams or detect the preamble once by using all of the signals received for the plurality of pairs of transception beams of a random access resource in step 702.

Referring to FIG. 8, in the beamforming system, one random access attempt in step 801 transmits the preamble for a plurality of pairs of different transception beams. In the beamforming system, when transmission power of the preamble is set as described in step 803, a difference between a transception beamforming gain value when the pass loss is estimated and a transception beamforming gain value when the random access preamble is transmitted should be considered.

In step 811, in the beamforming system, the terminal may transmit a preamble for one pair of transception beams and the base station may detect the preamble and transmit the random access response, and the terminal may transmit the preamble for the plurality of pairs of transception beams and the base station may detect the preamble by using several signals and transmit the random access response.

Figure 9:
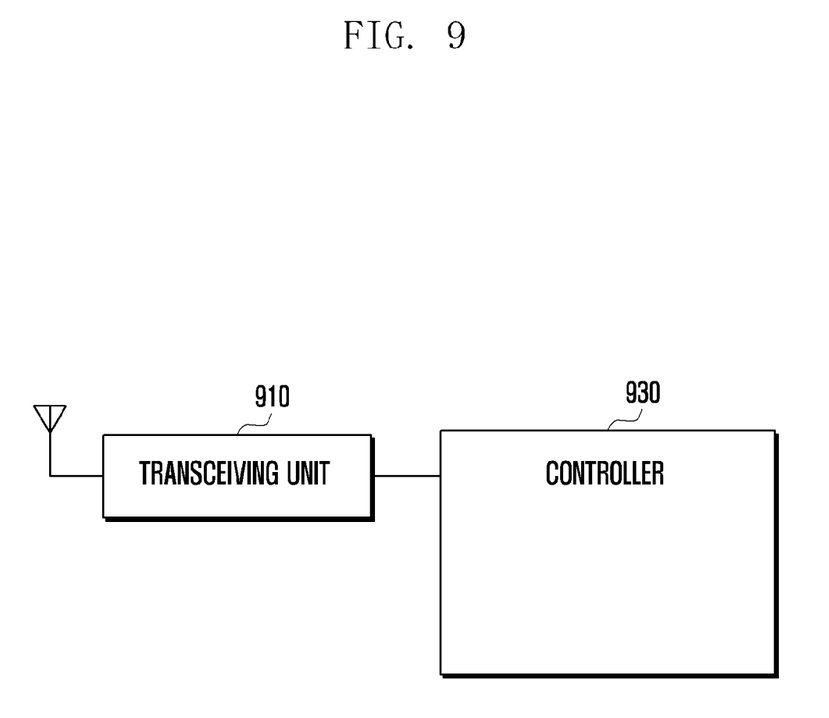
FIG. 9 illustrates a terminal according to an embodiment of the present invention.

FIG. 9 illustrates a terminal according to an embodiment of the present invention.

Referring to FIG. 9, the terminal includes a transceiving unit 910 and a controller 930. The transceiving unit 910 may perform communication with one or more network nodes, receive random access channel configuration information from a base station, receive a downlink signal, and transmit an uplink signal. The transceiving unit 910 may also transmit a random access preamble signal, and receive a result about a success or a failure of random access.

The controller 930 controls the general operation of the terminal. Further, the controller 930 may estimate path loss based on a downlink signal received from the base station, select a random access region based on the path loss, determine transmission power based on a false alarm probability of the selected random access region, and transmit, via the transceiving unit 910, a random access preamble to the base station, based on the determined transmission power.

Further, the controller 930 may receive random access channel configuration information from the base station. In this case, the random access channel configuration information may include random access resource mapping information such as preamble transmission resource information corresponding to a random access region.

Further, the controller 930 may determine a resource, by which the random access preamble is transmitted, based on the determined random access region and the random access resource mapping information.

The controller 930 may determine the transmission power based on target reception power directed by the selected random access region and the path loss. In this case, the false alarm probability may be determined based on the entire overhead of the base station and information on the number of times of random access for each region.

Further, the controller 930 may determine whether the random access succeeds, and when it is determined that the random access has failed, the controller 930 may select a new random access region by using a value increased by a predetermined level of the path loss, and transmit a random access preamble with transmission power determined based on the target reception power directed by the selected random access region and transmission power determined based on the value increased by a predetermined level of the path loss.

Further, when the wireless communication system is the beamforming system, the controller 930 may determine the path loss based on a representative value determined from the path loss for the plurality of pairs of beams.

In the above description, the configuration of the terminal is divided into blocks, but this is for convenience of the description, and the scope of the present invention is not limited thereto. Further, the controller 930 of the terminal may perform and control the operation of the aforementioned terminal with reference to FIGS. 3 to 8.

Figure 10:
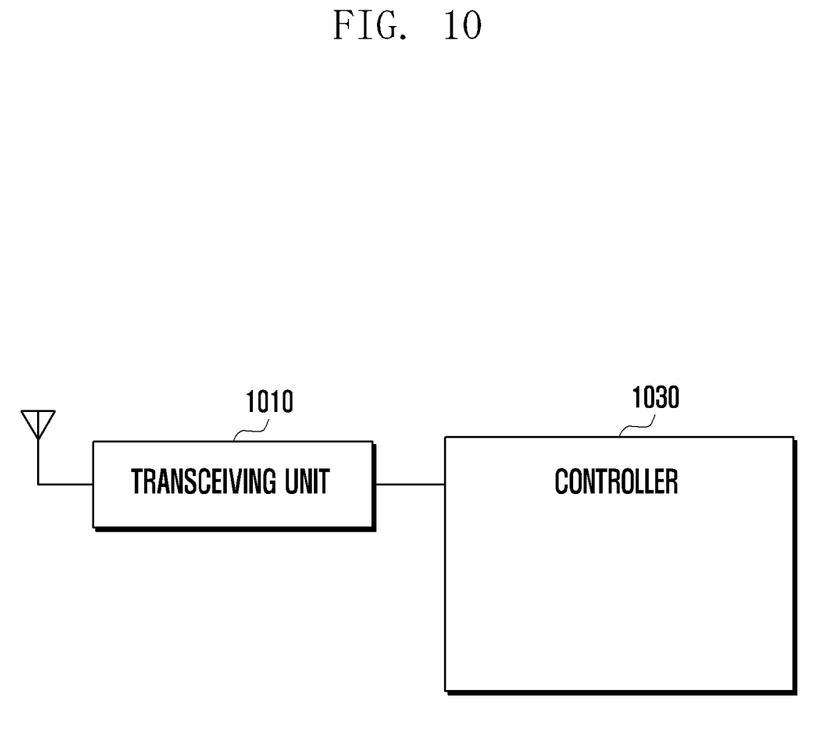
FIG. 10 illustrates a base station according to an embodiment of the present invention.

FIG. 10 illustrates a base station according to an embodiment of the present invention.

Referring to FIG. 10, the base station includes a transceiving unit 1010 and a controller 1030. The transceiving unit 1010 may perform communication with one or more network nodes, transmit random access channel configuration information to a terminal, transmit a downlink signal to the terminal, and receive an uplink signal from the terminal. The transceiving unit 1010 may also receive a random access preamble from the terminal.

The controller 1030 controls the general operation of the base station. Further, the controller 1030 may determine a random access preamble detection threshold value for a random access resource, and detect a signal received from the terminal from the random access resource based on the threshold value.

In this case, the random access resource may be determined in accordance with a random access region and the random access region may be determined based on path loss of the terminal and the base station.

Further, the controller 1030 may transmit, via the transceiving unit 1010, random access channel configuration information to the terminal. In this case, the random access channel configuration information may include random access resource mapping information such as random access resource information corresponding to a random access region.

Further, when the controller 1030 receives a signal from the terminal, intensity of the received signal transmitted from the terminal may be determined based on the path loss of the terminal and the base station and the resource mapping information.

In the above description, the configuration of the base station is divided into blocks, but this is for convenience of the description, and the scope of the present invention is not limited thereto. Further, the controller 1030 of the base station may perform and control the operation of the aforementioned base station with reference to FIGS. 3 to 8.

According to the above-described embodiments of the present invention, when the amount of overhead is limited due to a length of a preamble and a false alarm, it is possible to expand coverage of a base station. Further, when the amount of overhead is limited due to coverage of a base station and a false alarm, it is possible to decrease a length of a preamble.

Specifically, when a terminal transmits a random access preamble by using a plurality of beams in a wireless communication system, a base station may select a resource to adaptively transmit a preamble according to a channel situation of the terminal and differently set a threshold value according to each resource, so that cell coverage is expanded.

According to the above embodiments of the present invention, it is possible to provide a method and the apparatus for efficiently performing random access. Particularly, according to the above-described embodiments of the present invention, a method is provided for transmitting a preamble with different transmission power according to a mobile communication environment. Further, it is possible to detect a reception signal by using different threshold values.

In the above-described embodiments of the present invention, a constituent element may be expressed in a singular form or a plural form depending on a detailed embodiment. However, the singular or plural expression is selected appropriately for a situation suggested for convenience of the description, and the present invention is not limited by the single or plural constituent elements, and even though the constituent element is expressed in a plural form, the single constituent element may be formed, and even though the constituent element is expressed in a singular form, the plural constituent elements may be formed.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of transmitting a random access preamble by a terminal in a wireless communication system, the method comprising:
   receiving, from a base station, a message including information related to each of a plurality of random access regions, each of the plurality of random access regions being related to a respective target power;
   estimating path loss based on a downlink signal received from the base station;
   selecting a random access region from among the plurality of random access regions based on the estimated path loss;
   selecting a random access resource among multiple random access resources based on the selected random access region;
   determining a transmission power, based on the target power related to the selected random access region; and
   transmitting the random access preamble to the base station, based on the determined transmission power, using the selected random access resources,
   wherein when the wireless communication system is a beamforming system, estimating the path loss comprises determining the path loss based on a plurality of pairs of beams received from the base station.

2. The method of claim 1, further comprising receiving random access channel configuration information from the base station,
   wherein the random access channel configuration information includes random access resource mapping information including preamble transmission resource information related to the selected random access region, and
   wherein the preamble transmission resource information includes frequency information and time information.

3. The method of claim 2, further comprising determining a resource for transmitting the random access preamble, based on the selected random access region and the random access resource mapping information.

4. The method of claim 1, wherein determining the transmission power comprises determining the transmission power based on a target reception power related to the selected random access region and the estimated path loss.

5. The method of claim 1, wherein an overhead of the base station is determined based on a false alarm probability and information on a number of random access attempts for each of the plurality of random access regions of the base station.

6. The method of claim 1, further comprising:
   determining whether random access is successful; and
   when it is determined that the random access has failed, transmitting a new random access preamble with the transmission power increased by a predetermined size.

7. The method of claim 6, further comprising selecting a new random access region based on a new estimated path loss and the transmission power increased by the predetermined size.

8. A terminal for transmitting a random access preamble in a wireless communication system, the terminal comprising:
   a transceiver configured to transmit and receive a signal; and
   a controller configured to:
      receive, from a base station, a message including information related to each of a plurality of random access regions, each of the plurality of random access regions being related to a respective target power,
      estimate path loss based on a downlink signal received from the base station,
      select a random access region from among the plurality of random access regions based on the estimated path loss,
      select a random access resource among multiple random access resources based on the selected random access region, determine transmission power, based on the target power related to the selected random access region, and transmit, to the base station, via the transceiver, a random access preamble based on the determined transmission power, using the selected random access resource, wherein when the wireless communication system is a beamforming system, the controller estimates the path loss by determining the path loss based on a plurality of pairs of beams received from the base station.

9. The terminal of claim 8, wherein the transceiver is further configured to receive random access channel configuration information from the base station, and wherein the random access channel configuration information comprises random access resource mapping information including preamble transmission resource information related to the selected random access region, and wherein the preamble transmission resource information includes frequency information and time information.

10. The terminal of claim 9, wherein the controller is further configured to determine a resource for transmitting the random access preamble, based on the selected random access region and the random access resource mapping information.

11. The terminal of claim 8, wherein the controller is further configured to determine the transmission power based on a target reception power related to the selected random access region and the estimated path loss.

12. The terminal of claim 8, wherein an overhead of the base station is determined based on a false alarm probability and information on a number of random access attempts for each of the plurality of random access regions of the base station.

13. The terminal of claim 8, wherein the controller is further configured to:

determine whether random access is successful, and transmit a new random access preamble with the transmission power increased by a predetermined size, when it is determined that the random access has failed.

14. The terminal of claim 13, wherein the controller is further configured to select a new random access region based on a new estimated path loss and the transmission power increased by the predetermined size.

* * * * *